(12) United States Patent
Prentice, III

(10) Patent No.: US 8,794,321 B2
(45) Date of Patent: Aug. 5, 2014

(54) COMBUSTION THERMAL GENERATOR AND SYSTEMS AND METHODS FOR ENHANCED OIL RECOVERY

(71) Applicant: Advanced Combustion Energy Systems, Inc., Kingston, GA (US)

(72) Inventor: James A. Prentice, III, Kingston, GA (US)

(73) Assignee: Advanced Combustion Energy Systems, Inc., Kingston, GA (US)

(*) Notice: Subject to any disclaimer, the term of this patent is extended or adjusted under 35 U.S.C. 154(b) by 0 days.

(21) Appl. No.: 14/026,709

(22) Filed: Sep. 13, 2013

(65) Prior Publication Data

US 2014/0008063 A1    Jan. 9, 2014

Related U.S. Application Data

(62) Division of application No. 13/302,783, filed on Nov. 22, 2011, now Pat. No. 8,544,545.

(60) Provisional application No. 61/415,892, filed on Nov. 22, 2010.

(51) Int. Cl.
    *E21B 43/24*      (2006.01)
    *E21B 36/00*      (2006.01)
    *F23C 3/00*       (2006.01)
    *F23L 7/00*       (2006.01)
    *F22B 33/18*      (2006.01)

(52) U.S. Cl.
    CPC .............. *E21B 43/24* (2013.01); *F23L 7/002* (2013.01); *E21B 43/2406* (2013.01); *F22B 33/18* (2013.01)
    USPC .................... 166/272.3; 166/303; 431/158

(58) Field of Classification Search
    CPC . E21B 43/24; E21B 43/2406; E21B 43/2408; E21B 43/243; E21B 36/02
    USPC .............................. 166/272.3, 303; 431/158
    See application file for complete search history.

(56) References Cited

U.S. PATENT DOCUMENTS

| | | | |
|---|---|---|---|
| 4,064,977 A | 12/1977 | Taylor | |
| 4,137,968 A | 2/1979 | Howard et al. | |
| 4,385,661 A | 5/1983 | Fox | |
| 4,452,309 A | 6/1984 | Widmyer | |
| 4,456,068 A | 6/1984 | Burrill, Jr. et al. | |
| 4,604,988 A | 8/1986 | Rao | |
| 7,028,478 B2 | 4/2006 | Prentice, III et al. | |
| 7,640,987 B2 | 1/2010 | Kalman et al. | |
| 7,712,528 B2 | 5/2010 | Langdon et al. | |
| 7,780,152 B2 | 8/2010 | Rao | |
| 7,938,183 B2 | 5/2011 | Hart et al. | |
| 7,942,203 B2 | 5/2011 | Vinegar et al. | |
| 7,983,886 B2 | 7/2011 | Gullapalli et al. | |
| 2009/0188665 A1 | 7/2009 | Tubel et al. | |

*Primary Examiner* — Shane Bomar
*Assistant Examiner* — Wei Wang
(74) *Attorney, Agent, or Firm* — Sutherland Asbill & Brennan LLP

(57) ABSTRACT

An apparatus for combustion steam generation is provided, which includes a combustion chamber having an inlet end and an outlet end; a manifold at the inlet end configured to introduce a fuel and an oxidizer into the combustion chamber; an outer casing defining a coolant chamber between the outer casing and the combustion chamber; and a plurality of converging coolant inlets for conducting coolant from the coolant chamber into the combustion chamber at or near the outlet end of the combustion chamber. The converging coolant inlets are radially disposed around the combustion chamber and preferably configured to produce a converging-diverging nozzle from the coolant conducted into the combustion chamber. The device may be used in systems and methods for enhanced recovery of subterranean hydrocarbons, by deployment into and operation in a wellbore, where the produced steam and combustion gases are injected into a hydrocarbon formation to enhance hydrocarbon recovery.

14 Claims, 12 Drawing Sheets

COMBUSTION THERMAL GENERATOR AND SYSTEMS AND METHODS FOR ENHANCED OIL RECOVERY

CROSS-REFERENCE TO RELATED APPLICATIONS

This patent application is a divisional of U.S. application Ser. No. 13/302,783, filed Nov. 22, 2011, which claims the benefit of U.S. Provisional Application No. 61/415,892, filed Nov. 22, 2010, which are incorporated herein by reference in their entirety.

BACKGROUND

This invention relates generally to devices, systems, and methods for combustion, including but not limited to devices, systems, and methods for generating steam for example for use in hydrocarbon production, and in particular, enhanced production of heavy hydrocarbons from subsurface hydrocarbon formations.

Development of oil fields generally occurs in three stages. The first stage of oil field development is primary recovery. During primary recovery, one or more holes are drilled from the surface down into the hydrocarbon reservoir. The pressure present in the underground hydrocarbon reservoir forces hydrocarbons through the wellbore to the surface. Primary recovery continues until the pressure in the hydrocarbon reservoir is insufficient to force hydrocarbons through the wellbore to the surface. Typically only 5 percent to 15 percent of the original oil in the reservoir can be recovered during the primary recovery stage.

The second stage of oil field development is secondary recovery. During secondary recovery, various techniques may be used to recover hydrocarbons from reservoirs with depleted pressure. One technique, known as reservoir flooding, involves injecting fluids, such as water, to increase reservoir pressure in order to force hydrocarbons through the wellbore to the surface. An alternative technique, known as gas lift, involves injecting gases, such as carbon dioxide, to reduce the overall density of fluid in the wellbore. The formation pressure is then sufficient to force the less-dense fluid through the wellbore. Sometimes, pumps may be used to extract oil to the surface from the hydrocarbon reservoir. Typically, only 20 percent to 40 percent of a reservoir's original oil can be extracted by primary and secondary recovery.

The third stage of oil field development is tertiary recovery, also known as enhanced oil recovery (EOR). Following secondary recovery, a large percentage of hydrocarbons remain trapped in the reservoir. During EOR, various methods are used to increase the mobility of the oil in order to increase extraction. The most common method of EOR is steam injection. Typically, steam is produced using a steam generator at the surface, often part of a cogeneration plant. The steam then is injected into the reservoir through a wellbore where it heats the oil, thereby reducing its viscosity and making it easier to extract. Current steam-based oil recovery methods are effective only to about 2,500 feet due to heat and pressure losses. Surface steam production also undesirably generates substantial greenhouse gas emissions.

An alternative EOR method is carbon dioxide flooding, in which carbon dioxide is injected into an oil reservoir where it mixes with the oil, reducing its viscosity and making it easier to extract. Carbon dioxide flooding is particularly effective in reservoirs deeper than 2,000 feet where carbon dioxide is in a supercritical state. Other alternative EOR methods include injecting fluids that reduce viscosity and improve flow into the hydrocarbon reservoir. These fluids may include gases that are miscible with oil, air, oxygen, polymer solutions, gels, surfactant-polymer formulations, alkaline-surfactant-polymer formulations, or microorganism formulations. Current methods of EOR typically allow only an additional 5 percent to 15 percent of a reservoir's oil to be recovered.

The amount of hydrocarbons that are recoverable is determined by a number of factors including the depth of the reservoir, the permeability of the rock, and the strength of natural drives, such gas pressure, pressure from adjacent water, or gravity. One significant factor is the viscosity of the hydrocarbons in the reservoir. The viscosity of hydrocarbons ranges extensively from light to heavy. Lighter oils typically result in higher extraction rates. On the other hand, heavy oil, bitumen, and methane hydrate are highly viscous or solid and almost impossible to extract using conventional oil production methods. Heavy oil is typically classified as oil having an API gravity of about 10 to about 20 and a viscosity greater than about 100 cP. Bitumen is a semi-solid or solid hydrocarbon substance that typically has an API of less than about 10 and a viscosity of greater than about 10,000 cP. Methane hydrate is a solid form of methane trapped within a crystal structure of water. Heating methane hydrate can release gaseous methane from its crystal lattice structure.

Heavy oil and bitumen reserves below 2,500 feet onshore and at all depths offshore cannot be produced using current steam technology. According to a National Institute for Petroleum and Energy Research (NIPER) study, more than half of the 68 billion barrels of remaining heavy oil reserves in the United States are below 2,500 feet. A Technical, Economic, and Legal Assessment of North American Heavy Oil, Oil Sands, and Oil Shale Resources, U.S. Department of Energy, http://fossil.energy.gov/programs/oilgas/publications/oilshale/HeavyOilLowRes.pdf. If half of the heavy oil and oil sand deposits in the United States and Canada were brought to market, they alone could satisfy the current demand for crude oil in both countries for more than 150 years. America's Oil Shale: A Roadmap for Federal Decision Making, U.S. Department of Energy, http://fossil.energy.gov/programs/reserves/npr/publications/oil_shale_roadmap.pdf.

Accordingly, it would be highly desirable to provide devices, systems, and methods for enhanced production of hydrocarbons from subsurface hydrocarbon formations. It would be particularly desirable to provide devices, systems, and methods for extraction of heavy oil, bitumen, and/or methane hydrate deposits, especially at depths greater than 2,500 feet.

U.S. Pat. Nos. 4,604,988 and 7,780,152 disclose efforts to solve this problem by providing a downhole steam generator. However, improvements are needed to provide combustion devices that are more efficient, reliable, and/or durable in long-term continuous use.

SUMMARY

In one aspect, an apparatus for combustion steam generation is provided. In one embodiment, the device includes a combustion chamber having an inlet end and an outlet end; a manifold housing connected to the inlet end and configured to introduce a fuel and an oxidizer into the combustion chamber; an outer casing defining a coolant chamber between an inner surface of the outer casing and an outer surface of the combustion chamber; and a plurality of converging coolant inlets for conducting coolant from the coolant chamber into the combustion chamber at or near the outlet end of the combustion chamber, wherein the plurality of converging coolant inlets are radially disposed around the combustion chamber.

The plurality of converging coolant inlets may be configured to produce a converging-diverging nozzle from the coolant conducted into the combustion chamber. The apparatus may further include an exit flame diffuser located in fluid communication with the outlet end of the combustion chamber. The apparatus preferably is sized to fit within industry standard well casings and/or to pass through standard turn sweeps used in horizontal wells.

In another aspect, systems and methods are provided for extracting oil from an oil formation including a first wellbore for delivering steam and/or other hot gases to a hydrocarbon reservoir; and an advanced combustion thermal generator device, wherein the apparatus may be located downhole in the first wellbore. The device may be located at a depth greater than 2,500 feet in the first wellbore. The system may include a second wellbore for extracting hydrocarbons from the hydrocarbon reservoir.

In a further aspect, methods are provided for producing steam. The methods may include introducing a fuel and an oxidizer into an inlet end of a combustion chamber; combusting the fuel and the oxidizer in the combustion chamber to produce a combustion product; flowing a water into a coolant chamber defined between an outer casing and an outer surface of the combustion chamber at or near the inlet end of the combustion chamber; flowing the water from the coolant chamber, through a plurality of converging coolant inlets radially disposed around the combustion chamber, and into the combustion chamber at or near the outlet end of the combustion chamber, such that the water forms a converging-diverging nozzle through which the combustion product flows, the water becoming heated by the combustion product to form steam.

In still another aspect, methods are provided for extracting hydrocarbons from a hydrocarbon formation. The methods may include deploying an apparatus having a combustion chamber into a wellbore; introducing a fuel and an oxidizer into an inlet end of a combustion chamber; combusting the fuel and the oxidizer in the combustion chamber to produce a combustion product; flowing a water into a coolant chamber defined between an outer casing and an outer surface of the combustion chamber at or near the inlet end of the combustion chamber; flowing the water from the coolant chamber, through a plurality of converging coolant inlets radially disposed around the combustion chamber, and into the combustion chamber at or near the outlet end of the combustion chamber, such that the water forms the throat of a converging-diverging nozzle through which the combustion product flows, the water becoming heated by the combustion product to form steam; injecting the combustion product and/or the steam into the hydrocarbon formation; and extracting hydrocarbons from the hydrocarbon formation. In one variation, the apparatus having the combustion chamber is deployed into a wellbore at a depth of at least 2,500 ft below the surface.

In yet another aspect, a method is provided for forming a convergent-divergent nozzle. The method may include combusting a fuel and an oxidizer in a cylindrical combustion chamber to form a combustion product; and injecting water into an aft end of the cylindrical combustion chamber through a plurality of water inlets radially disposed around the cylindrical combustion chamber. In a particular embodiment, the flow rate of the combustion product accelerates to the speed of sound as it converges.

In still another aspect, a convergent-divergent nozzle device is provided, which includes an elongated annular tube having a tube wall defining a flow channel; and a nozzle located at least partially within the elongated annular tube, the nozzle having a converging section, a throat, and a diverging section, wherein the nozzle is formed by a gas flowing through the tube and a liquid flowing through a plurality of apertures radially disposed about and extending through the tube wall, the longitudinal axis of each aperture extending at an angle to the direction of the flow of the gas.

DETAILED DESCRIPTION

Figure 1:
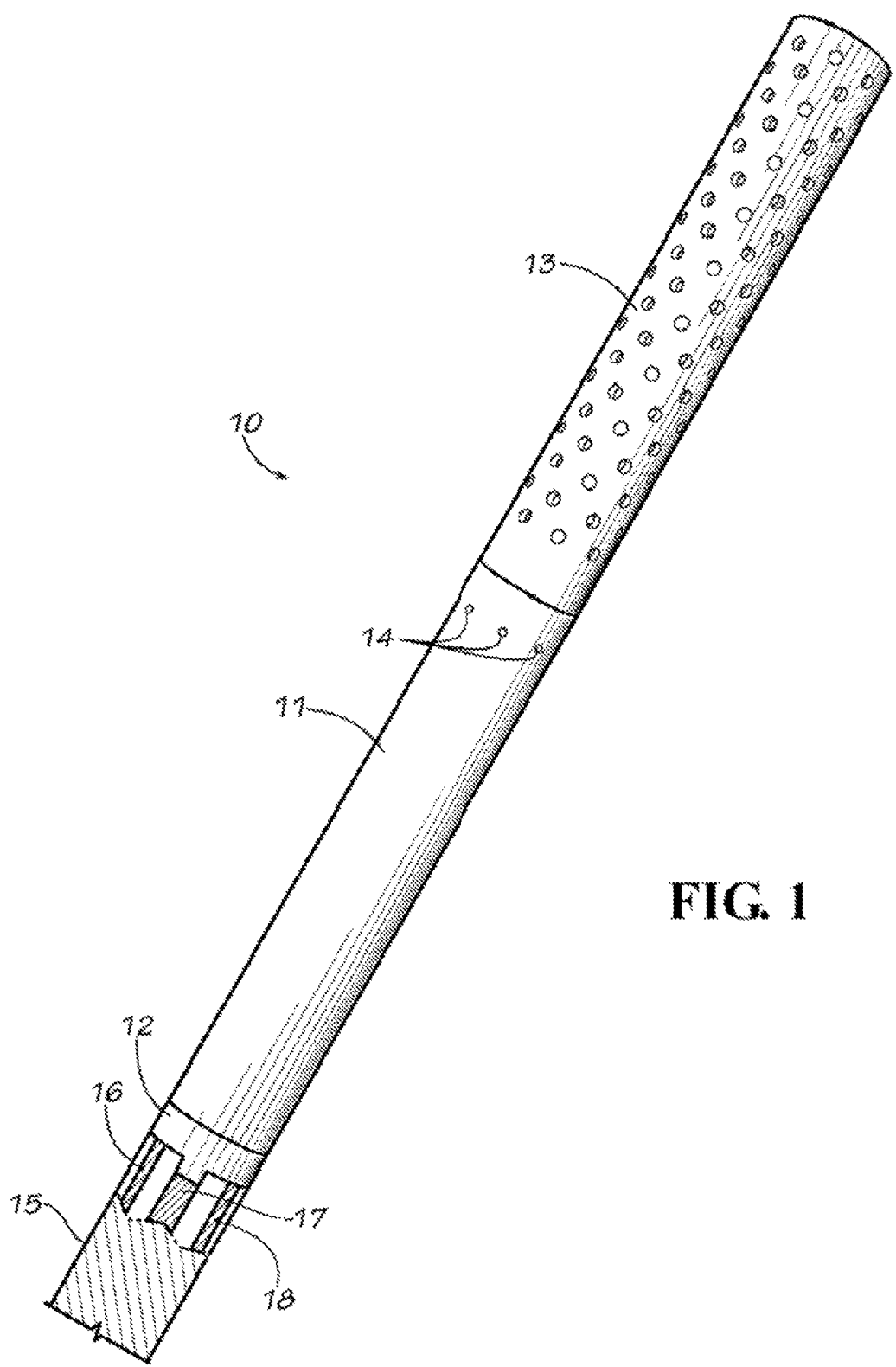
FIG. 1 is a plan view, with a portion cut away, depicting one embodiment of an apparatus for combustion steam generation as described herein.

The present devices, systems and methods may be understood more readily by reference to the following detailed description of preferred embodiments of the invention, and by reference to the drawings in which like numerals indicate like elements throughout the separate views.

Devices, systems, and methods for producing steam are provided, which include an improved design of a combustion apparatus that introduces coolant into the exit end portion of the combustion chamber to merge the coolant with the combustions product gases in an advantageous manner, to efficiently produce a high velocity, high quality steam. The design beneficially can cause the coolant to form a convergent-divergent nozzle, which, unlike solid nozzle subjected to continuous use, will not wear (because the water of the water-formed nozzle is being continuously replaced). This is a substantial advantage in terms of durability and commercial viability. In a preferred embodiment, the present steam generation devices and systems advantageously are operable continually or continuously over an extended period, such as several days, months, or even years.

Among other possible uses, these devices, systems, and methods are particularly useful for enhanced extraction of hydrocarbons from hydrocarbon reservoirs or hydrocarbon formations. The device may be placed downhole in a well casing to produce steam at the interface of a hydrocarbon formation, thereby efficiently delivering steam, carbon dioxide, and other combustion gases to the hydrocarbon formation while minimizing surface losses. These devices, systems, and methods also are useful to dislodge and fluidize oil in existing oil wells that are considered dry (uneconomical, minimally productive, or non-productive) or that is unrecoverable through any other existing technology.

These devices, systems, and methods are particularly useful for extraction of heavy oil, bitumen, and/or methane hydrate deposits. As used herein, "heavy oil" is highly viscous oil having an API gravity of about 10 to about 20 and a viscosity greater than about 100 cP. As used herein, "bitumen" is a semi-solid or solid hydrocarbon substance having an API of less than about 10 and a viscosity of greater than about 10,000 cP. The devices, systems, and methods of the present invention have no depth limitation and may be useful for extraction of hydrocarbons at all depths, including at depths greater than 2,500 feet. The devices, systems, and methods may be used either onshore of offshore.

I. Combustion Apparatus/Steam Generator

In one embodiment, apparatus for combustion steam generation is provided that includes: (a) a combustion chamber having an inlet end and an outlet end; (b) a manifold housing connected to the inlet end of the combustion chamber that is configured to introduce a fuel and an oxidizer into the combustion chamber; (c) an outer casing defining a coolant chamber between an inner surface of the outer casing and an outer surface of the combustion chamber; and (d) a plurality of converging coolant inlets for conducting coolant from the coolant chamber into the combustion chamber. In certain embodiments, the plurality of converging coolant inlets may be configured to produce a converging-diverging nozzle from the coolant conducted into the combustion chamber. Such an apparatus or device may be termed herein an advanced combustion thermal generator ("ACTG") device.

As shown in FIG. 1, the ACTG device 10 is generally cylindrical in shape. The ACTG device 10 includes an outer casing 11, a manifold housing 12, and an exit flame diffuser 13. The outer casing 11, manifold housing 12, and exit flame diffuser 13 are assembled and together form the outer portion of the ACTG device 10. The manifold housing 12 may be connected to the outer casing 11 in any suitable manner. In one embodiment, the manifold housing 12 includes a threaded portion that is screwed together with a threaded inner portion of the outer casing 11 to form a gas- and fluid-tight seal. The exit flame diffuser 13 also may be connected to the outer casing 11 in any suitable manner. In the embodiment shown, the aft end of the outer casing 11 is connected to the exit flame diffuser 13 by a plurality of screws 14 radially disposed around the aft end of the outer casing 11. The screws engage with threaded holes in the exit flame diffuser 13 thereby creating a gas- and fluid-tight seal between the outer casing 11 and the exit flame diffuser 13.

The manifold housing 12 of the ACTG device 10 is connected to a control line 15 that connects the ACTG device 10 to the surface (above ground). The control line 15 optionally may be a coiled tubing control line made of an armor wired steel umbilical cable. The control line 15 includes a fuel line 16, an oxidizer line 17, and a coolant line 18. The fuel line 16, oxidizer line 17, and coolant line 18, are connected to a fuel source, and oxidizer source, and a coolant source, respectfully, which may be located at the surface. In one embodiment, the fuel line 16, oxidizer line 17, and coolant line 18 are one inch stainless steel tubes. The control line optionally may also include one or more power and data lines. The control line optionally may also include one or more lines for lubricants or other miscellaneous needs.

The ACTG device 10 is compact and may be dimensioned for placement down hole in the wellbore of an oil well. The ACTG device 10 may be used in both vertical and horizontal wells. The ACTG device 10 may be sized to fit industry standard well casings. Well casings are high-strength steel pipe that generally are 20- to 40-feet in length. The well casings are screwed together to make up a casing string and are inserted into the borehole of a wellbore. Typically well casings are held into place with cement. Industry standard oil well casing include, without limitation, standard 5-inch, 6-inch, and 7-inch casings. The ACTG device 10 also may be sufficiently compact to accommodate standard turn sweeps used in horizontal wells, such as horizontal wells used in steam assisted gravity drainage (see FIG. 9, described below). Steam assisted gravity drainage is an enhanced oil recovery technique in which a pair of horizontal wells are drilled into an oil reservoir. One of the horizontal wells is located above the other well. Low pressure steam is continuously injected into the upper wellbore to heat the oil and reduce its viscosity, causing the heated oil to drain into the lower wellbore, where it is pumped to the surface.

Figure 2:
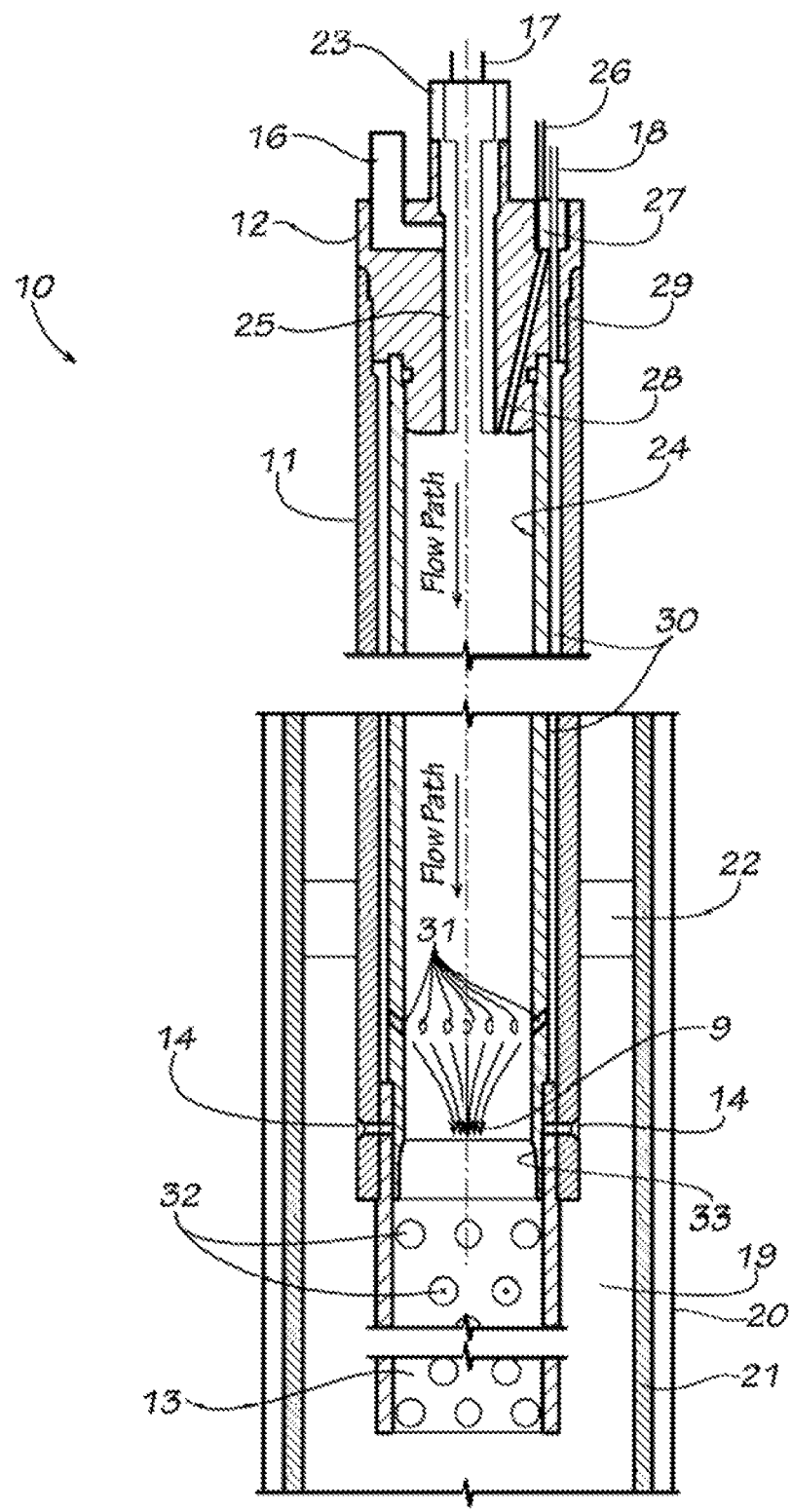
FIG. 2 is a cross sectional view of an embodiment of an apparatus for combustion steam generation as described herein.

As shown in FIG. 2, the ACTG device 10 may be deployed in a wellbore 19 having a wellbore wall 20. A wellbore casing 21 lines the outside of the wellbore 19. A packer 22 is located in the annular space between the ACTG device 10 and the wellbore casing 21. Packers are sealing devices used to isolate zones inside of well casings. The packer provides an annular seal between the outer casing 11 and the wellbore casing 21 to prevent flow of steam, combustion gases, oil or other fluids up the casing string toward the surface. The packer also holds the ACTG device 10 in place in the center of the wellbore. In other embodiments of the invention, the packer may provide an annular seal between the outer casing and a wall of a wellbore. Standard oil well packers may be used in accordance with embodiments of the invention.

The manifold housing 12 of the ACTG device 10 is connected at one end to a fuel line 16 and an oxidizer line 17. The fuel line 16 is connected to a fuel source, which may be located at the surface. The term "fuel" as used herein means any substance or material that is consumed to produce energy, including without limitation natural gas, hydrogen, methane, ethane, propane, butane, gasoline, diesel fuel, kerosene, fuel oil, methanol, or alcohol, or combinations thereof. In a preferred embodiment, the fuel is methane or natural gas. The oxidizer line 17 is connected to an oxidizer source, which may be located at the surface. In accordance with embodiments of the invention, the oxidizer may include any gaseous or liquid oxidizer source, including without limitation air, gaseous oxygen (GOX), liquid oxygen (LOX), O, $O_3$, $H_2O_2$, or HAN, or combinations thereof. In a preferred embodiment, the oxidizer is GOX.

An oxidizer, such as GOX, travels through the oxidizer line 17 to a pintle 23, which is attached to the manifold housing 12. The pintle 23 may generally be cylindrical in shape and may fit within a cylindrical hole through the manifold housing 12. The pintle 23 may be attached to the manifold housing in any suitable manner. In one embodiment, the pintle 23 includes a threaded portion that is screwed together with a threaded inner portion of the manifold housing 12 to form a gas- and fluid-tight seal. Oxidizer flows through the pintle 23 into an inlet end of a combustion chamber 24. The combustion chamber 24 may be cylindrical in shape. A fuel, such as methane, travels through the fuel line 16, which is connected to the manifold housing 12. The an inner surface of the manifold housing 12 and an outer surface of the pintle 23 define a fuel passage way 25. The fuel flows from the fuel line 16 through the fuel passage way 25 into an inlet end of the combustion chamber 24. The fuel and oxidizer may mix at or near an inlet end of the combustion chamber 24.

The components of the ACTG device 10 may be formed of any suitable material, examples of which include high-temperature metals and alloys, including but not limited to nickel-chromium alloys known in the art. In one embodiment, one or more of the components are made from Hanyes™ 230™ Alloy (Haynes International, Kokomo, Ind., USA).

The manifold housing 12 of the ACTG device 10 also is connected at one end to a power line 26. The power line 26 is connected to a power source, which may be located at the surface. In an alternative embodiment, the invention may include an integrated power supply, such as a battery. An embodiment of the invention optionally may also include one or more power and/or data lines. A power or data line may comprise one or more fiber optic power or data lines. The power line 26 is connected to an igniter system 27. The igniter system may comprise a multi-spark discharge (MSD) ignition system. The igniter system may comprise a spark plug, oxidizer supply, and/or fuel supply. An embodiment of the invention optionally may include a fiber optic data line for controlling the igniter at the point of combustion. The fiber optic data line may transfer data to a computer control program on the surface. The ACTG device 10 may also include one or more sensors, for example temperature and/or pressure sensors, which are known in the art. The fiber optic data line also may transfer data from such sensors to a computer control program on the surface. When the igniter system 27 is activated, a spark or flame passes through the ignition flame torch pathway 28. The spark or flame causes the fuel and oxidizer to ignite in the combustion chamber 24. The combustion of the fuel and oxidizer in the combustion chamber 24 produces a combustion product. The combustion product may include carbon dioxide and steam. The combustion of the fuel and oxidizer in the combustion chamber 24 also produces thermal energy.

The manifold housing 12 of the ACTG device 10 also is connected at one end to a coolant line 18. The coolant line 18 is connected to a coolant source, which may be located at the surface. In accordance with embodiments of the invention, the coolant may include water or another substance or material that has suitable coolant properties. In a preferred embodiment, the coolant is water. Coolant may be injected through a series of coolant pathways 29 in the manifold housing 12. The coolant may pass through the series of coolant pathways 29 into a coolant chamber 30. The coolant chamber 30 is defined by an inner surface of the outer casing 11 of the ACTG device 10 and an outer surface of the combustion chamber 24.

Coolant passes through the coolant chamber 30 and thereby provides cooling to the combustion chamber 24. An inner surface of the outer casing 11 and/or an outer surface of the combustion chamber 24 may have helical grooves or rifling. Such grooves or rifling include any helical pattern, whether raised or lowered into the surface of a wall of the coolant chamber 30. Such helical groves may promote a helical, or spiral, flow path of coolant through the coolant chamber 30. A helical, or spiral, flow path provides more even distribution/flow of coolant in the coolant chamber and/or may increase turbulence, thereby reducing undesirable hot spots that may otherwise have a tendency to form in the combustion chamber 24 and/or coolant chamber 30.

A plurality of converging coolant inlets 31 are provided at or near an outlet end of the combustion chamber 24. The converging coolant inlets are holes extending through a wall of the combustion chamber 24 that form a flow path for conducting coolant from the coolant chamber 30 into the combustion chamber 24. The converging coolant inlets 31 are radially disposed around the combustion chamber 24. Coolant flows through the converging coolant inlets 31 into the combustion chamber 24 at or near the outlet end of the combustion chamber 24. The converging coolant inlets 31 are configured to produce a converging-diverging nozzle 9 from the coolant conducted into the combustion chamber 24. Converging-diverging nozzles are described in more detail in section II below. The coolant flows through the converging coolant inlets 31 into the combustion chamber 24 at an angle to the flow path of the combustion product through the combustion chamber 24. In a preferred embodiment, the angle is between about 25 and about 35 degrees to the flow path (i.e., between about 25 and about 35 degrees to the axis of the combustion chamber 24). In another preferred embodiment, the angle is about 30 degrees to the flow path (i.e., about 30 degrees to the axis of the combustion chamber 24).

The combustion product accelerates through the converging-diverging nozzle formed by the flow of coolant into the combustion chamber 24 and passes through the outlet end of the combustion chamber 24. The outlet end of the combustion chamber is connected to an exit flame diffuser 13 by a plurality of screws 14 radially disposed around the aft end of the outer casing 11. The exit flame diffuser 13 is in fluid communication with the outlet end of the combustion chamber 24. The exit flame diffuser 13 is generally cylindrical in shape. A plurality of holes 32 are provided in the walls of the exit flame diffuser 13. The combustion chamber 24 and/or exit flame diffuser 13 form a diverging section 33 of the converging-diverging nozzle formed by the flow of coolant through the converging water inlets 31. The exit flame diffuser 13 may control flame impingement from the combustion chamber 24 to the well casing 21. The exit flame diffuser 13 also may provide cooling to the combustion chamber 24, thereby providing a homogeneous mixture to the exhaust flame. The exit flame diffuser 13 further may provide for transfer of additional thermal energy from the combustion product to the coolant, thereby increasing steam production. A mixture of combustion product and steam may exit through the exit flame diffuser holes 32 and/or an outlet end of the exit flame diffuser into the wellbore 19.

Figure 3:
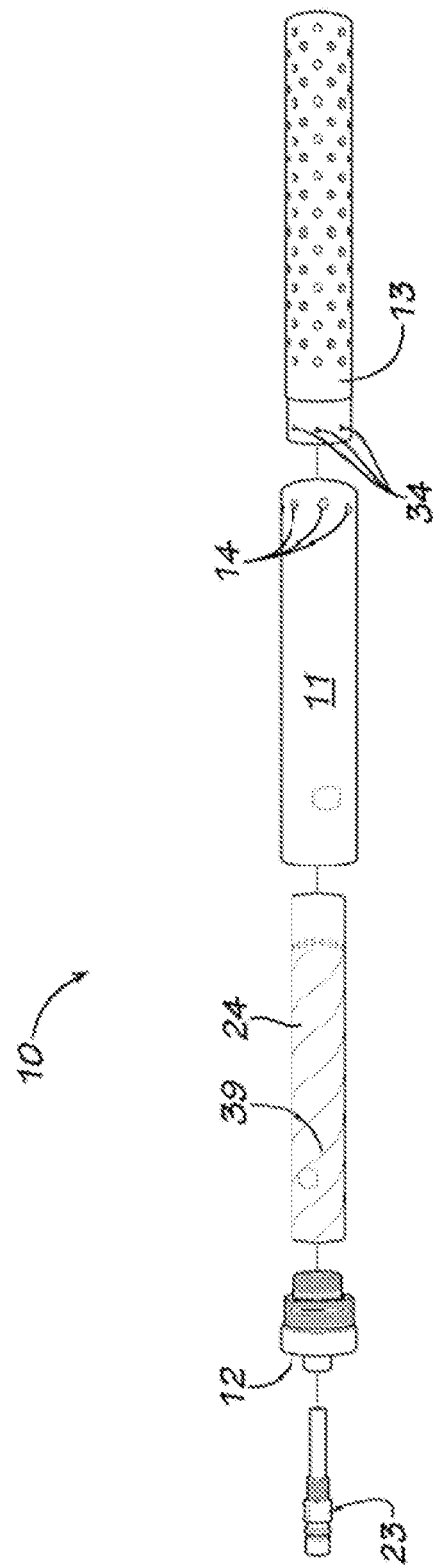
FIG. 3 is an exploded view of an embodiment of a combustion apparatus for steam generation as described herein.

FIG. 3 provides another view to understand the components of the ACTG device 10. Specifically, FIG. 3 shows a pintle 23, a manifold housing 12, a combustion chamber 24, an outer casing 11, and an exit flame diffuser 13. The ACTG device 10 may exist as an assembly, as shown in FIGS. 1-2. The ACTG device 10 is assembled by connecting the pintle 23 within the manifold housing 12, for example by screwing an outer threaded portion of the pintle 23 into an inner threaded portion of the manifold housing 12. The manifold housing 12 is connected to the combustion chamber 24, for example by screwing an inner threaded portion of the combustion chamber 24 to a threaded outer portion of the manifold housing 12. The surface of the combustion chamber 24 has helical grooves 39 in accordance with a preferred embodiment. Alternatively or additionally, an inner surface of the outer casing 11 may have helical grooves in accordance with a preferred embodiment of the invention. The outer casing 11 fits over the combustion chamber 24 and connects to the manifold housing 12, for example by screwing an inner threaded portion of the outer casing 11 to a threaded outer portion of the manifold housing 12. When assembled, the annular space between the outer casing 11 and the combustion chamber 24 defines a coolant chamber (not shown). The exit flame diffuser 13 connects to the outer casing by a plurality of screws 14 radially disposed around the aft end of the outer casing 11. The screws engage with threaded holes 34 in the exit flame diffuser 13 thereby creating a gas- and fluid-tight seal between the outer casing 11 and the exit flame diffuser 13. When assembled, the exit flame diffuser 13 is in fluid communication with the combustion chamber 24.

Figure 4:
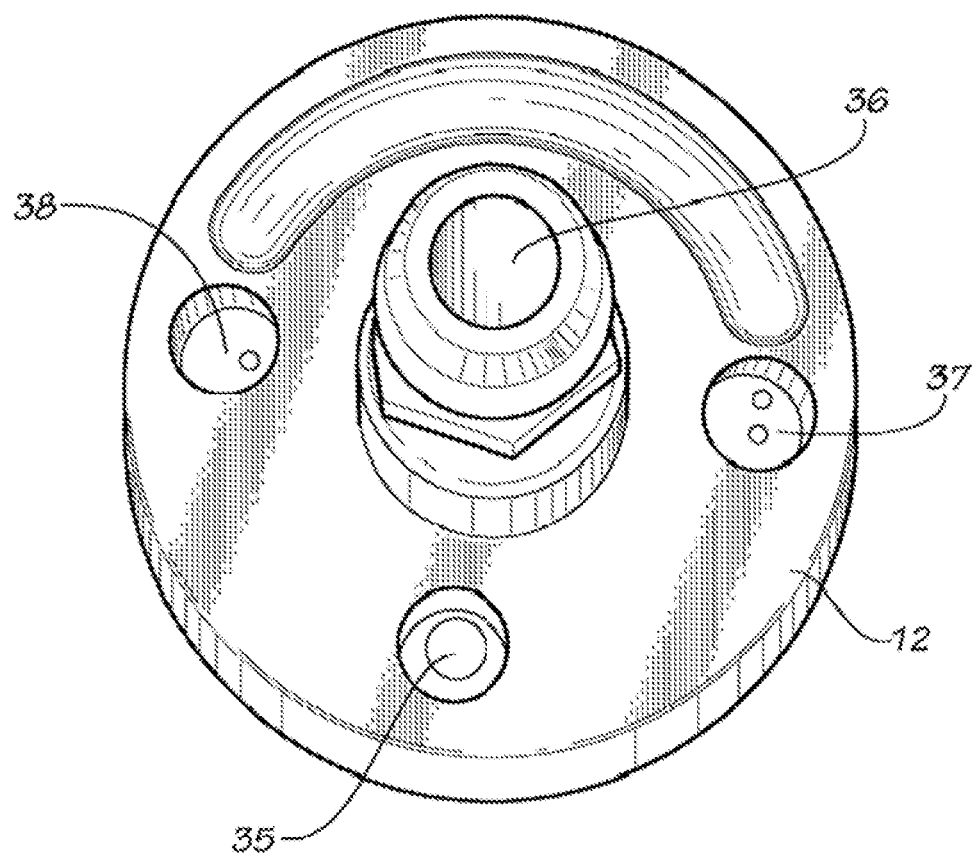
FIG. 4 is a perspective view of an exterior end portion of one embodiment of a manifold housing of an apparatus for combustion steam generation as described herein. (Only the manifold housing is shown; other components are omitted for clarity.)
Figure 5:
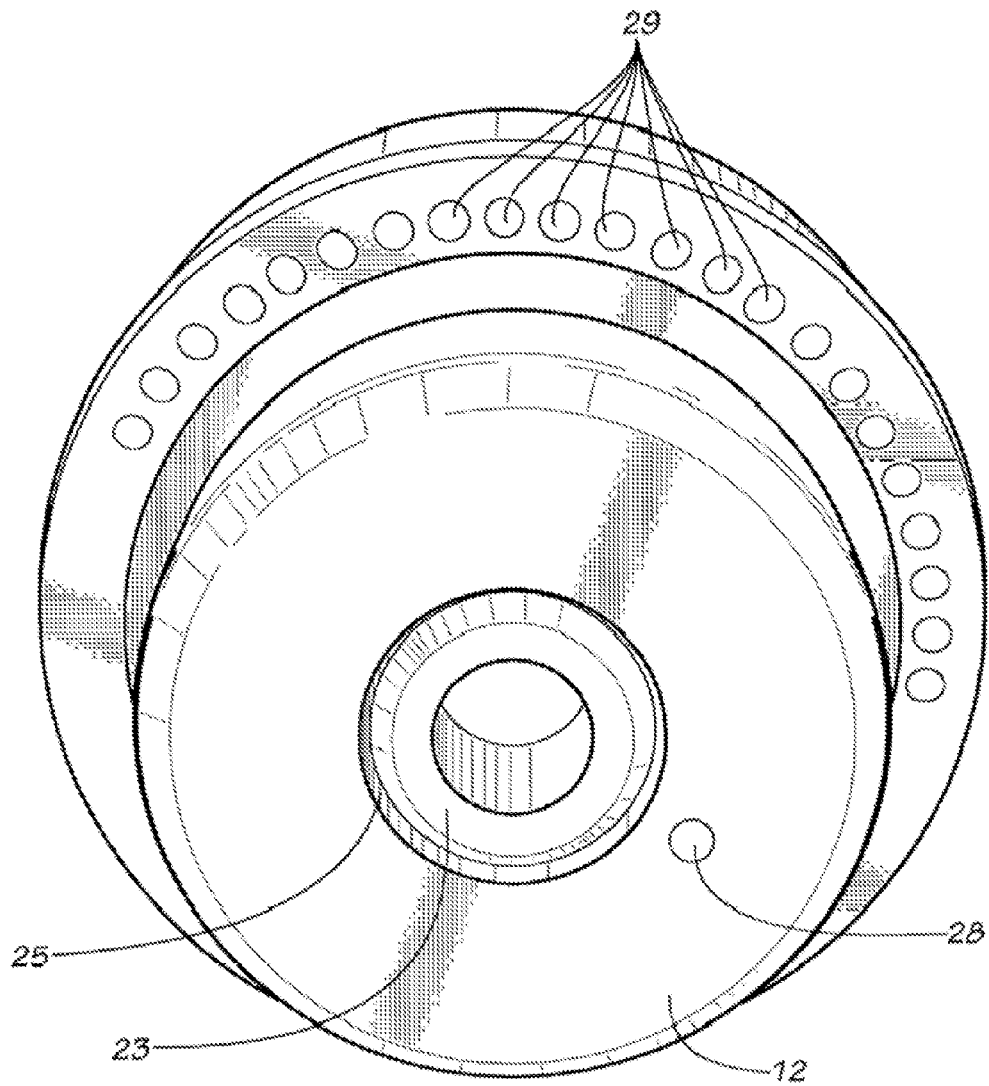
FIG. 5 is a perspective view of the opposite side of the manifold housing of FIG. 4.

Details of one embodiment of the manifold housing 12 are shown in FIGS. 4 and 5. The manifold housing 12 includes a fuel inlet 35, an oxidizer inlet 36, a coolant inlet 37, and a power and data systems inlet 38. The fuel inlet 35 may be connected to a fuel line. The fuel line may, in turn, be connected to a fuel source, which may be located at the surface of the well. The oxidizer inlet 36 may be connected to an oxidizer line. The oxidizer line may, in turn, be connected to an oxidizer source, which may be located at the surface. The coolant inlet 37 may be connected to a coolant line. The coolant line may, in turn, be connected to a coolant source, which may be located at the surface. The power and data systems inlet 38 may be connected to power and/or data lines. The power and/or data lines may, in turn, be connected to a power source, computer, and/or control systems, which may be located at the surface. It is envisioned that the number and/or placement of any of these inlets may be varied.

As shown in FIG. 5, the manifold housing 12 is connected with a pintle 23. Oxidizer flows from an oxidizer line through the pintle 23 into the combustion chamber. The manifold housing 12 and pintle 23 together form a fuel passageway 25 through which fuel flows from a fuel line into the combustion chamber. Coolant flows from a coolant line through a series of coolant pathways 29 in the manifold housing 12 into a coolant chamber formed by the outer casing and the combustion chamber. The manifold housing 12 also includes an ignition flame torch pathway 28. An igniter system may be located within the manifold housing 12. When the igniter system is activated, a spark or flame may pass through the ignition flame torch pathway 28 and may cause fuel and oxidizer to ignite in the combustion chamber.

II. Converging-Diverging Nozzle

The ACTG device may be configured so as to produce a converging-diverging nozzle from the coolant conducted into the combustion chamber. A converging-diverging nozzle, also known as a de Laval (or DeLaval) nozzle, is a device that accelerates a high temperature, high pressure gas to a supersonic speed. Typically, it is a tube that is pinched in the middle to form a balanced, asymmetric hourglass-shape. An exemplary converging-diverging nozzle is shown and described in U.S. Pat. No. 4,064,977, which is incorporated herein by reference in its entirety.

Generally a converging-diverging nozzle includes a converging section, a throat, and a diverging section. Typically it is made of steel, copper, graphite, or another type of ablative material that is susceptible to wear over time.

A convergent-divergent nozzle operates by forcing a constant mass flow rate of gas through an orifice with a small cross-section. From the point of view of the gas in the converging section, the nozzle is a hole, or "throat," that leads to a lower pressure area. As the gas approaches the throat, it begins to accelerate. The gas continues to accelerate toward the throat, ultimately reaching the speed of sound at the throat. The "speed of sound" as used herein is the speed of sound in the hot gas, not the speed of sound in air at ground level in ambient conditions. The speed of sound in hot gas typically is 2 to 3 times faster than the speed of sound in air at ground level in ambient conditions, depending on temperature.

After the gas reaches sonic speed at the throat, it flows into the diverging section, where the gas expands and cools, pushes sideways at an oblique angle to the wall, and accelerates to supersonic speeds. A bell-shaped divergent section of the nozzle provides maximum efficiency, but a simple cone-shaped divergent section provides 99 percent efficiency and can provide more cost-effective construction. The divergent section of the nozzle can increase the speed of the gas by 2.7 times the speed of sound or more, depending on the exact ratio of the cross-sectional area at the throat to the cross-sectional area at the exit from the nozzle.

The nozzle functions to convert the potential energy of the high temperature, high pressure gas into kinetic energy. Because of the high temperature and high velocity of gases passing through the throat of a typical converging-diverging nozzle, the throat of the nozzle may erode, resulting in undesirable increases in throat diameter and decreases in chamber pressure and gas velocity. The erosion in the nozzle throat ultimately limits the life of the nozzle and the run time of the device incorporating the nozzle.

Advantageously, the advanced combustion thermal generators described herein utilize converging-diverging nozzles formed by the flow of coolant, which preferably is water, instead of by mechanical means such as a metal throat. Accordingly, the device may operate for years underground without needing to replace components, such as the nozzle, of the device.

In one aspect, a method is provided for forming a convergent-divergent nozzle by combusting a fuel and an oxidizer in a cylindrical combustion chamber to form a combustion product and by injecting water into an aft end of the cylindrical combustion chamber through a plurality of converging water inlets radially disposed around the cylindrical combustion chamber. The water is injected into the combustion chamber at an angle ($\Theta$ shown in FIG. 12) to the axis of the cylindrical combustion chamber in a manner effective to cause the combustion product to converge by decreasing the effective cross-sectional area of the combustion chamber. The water being pushed through the combustion chamber eventually reaches a density such that the gas can compress no further, and the water thereby establishes the throat of the de Laval nozzle. In a preferred embodiment, the water may be injected at an angle between about 25 degrees and about 35 degrees to the axis of the cylindrical combustion chamber. In another preferred embodiment, the water may be injected at an angle of about 30 degrees to the axis of the combustion chamber. In another preferred embodiment, the flow rate of the combustion product accelerates to the speed of sound as it converges.

Figure 6:
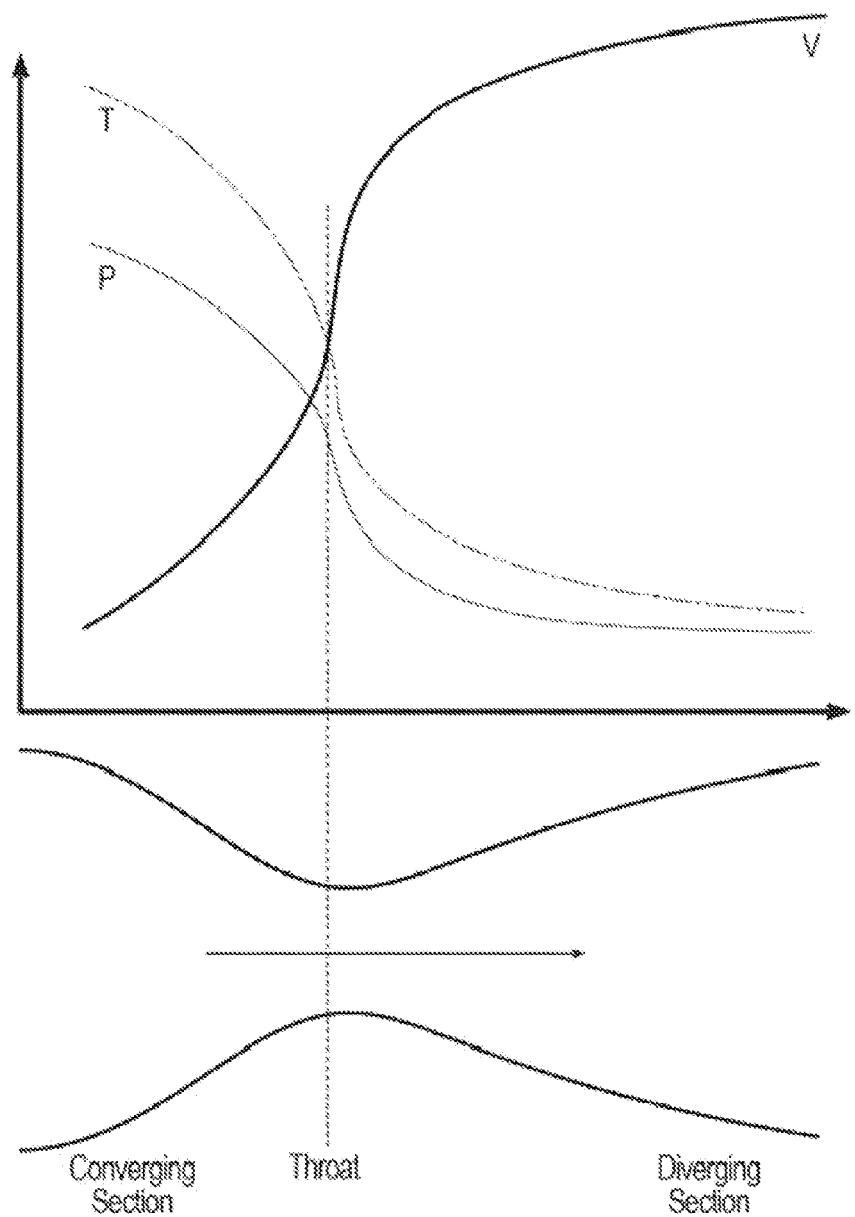
FIG. 6 is a graph illustrating temperature, pressure, and velocity curves across a converging-diverging nozzle according to one embodiment of the present disclosure.

FIG. 6 is a graph illustrating temperature, pressure, and velocity curves across a converging-diverging nozzle in accordance with an embodiment of the devices and systems described herein. As the combustion product flows through the combustion chamber it nears the outlet end of the combustion chamber and enters the converging section of the nozzle. As it converges, the combustion product accelerates and the temperature and pressure begin to decrease. At the throat, which is formed by the flow of water into the combustion chamber, the velocity increases significantly to sonic speeds and the temperature and pressure of the gases drop accordingly. As the combustion product exits the throat and enters the diverging section of the combustion chamber and/or exit flame diffuser the velocity increases to supersonic speeds and the pressure and temperature drop further.

It will therefore be appreciated that the coolant may serve at least two purposes in the device. First, the coolant provides cooling of the combustion chamber as it flows through the coolant chamber. Second, the injection of coolant into the combustion chamber at an angle to the axis of the combustion chamber may create a converging-diverging nozzle to accelerate the velocity of the combustion product and steam discharged from the ACTG. It also will be appreciated that the flow rate of coolant, fuel, and/or oxidizer may be variable and adjustable so that as the pressure of hydrocarbons in the hydrocarbon formation changes, the flow rate of coolant may change accordingly to compensate for those changes. Thus, the flow rate of coolant, fuel, and/or oxidizer may be adjusted so as to provide an injectable flow rate of gases into the formation and optimal performance of embodiments of the device. It also will be appreciated that the flow of combustion product and coolant causes minimal or no erosion to surfaces of embodiments of the device.

The water injected into the cylindrical chamber through the converging water inlets may exit into the exit flame diffuser and mix with the combustion product. There, the water may convert to steam and exit the ACTG device into the wellbore or hydrocarbon formation.

Figure 7:
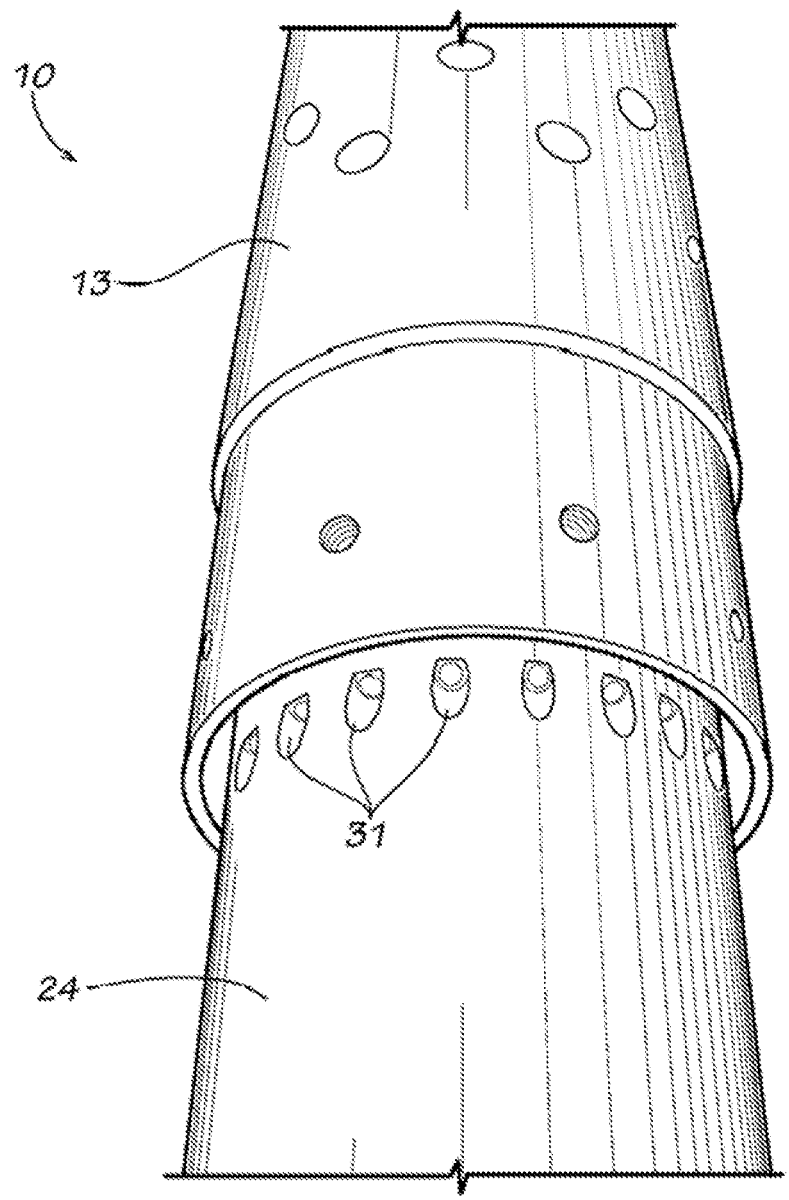
FIG. 7 is a close-up, perspective view of a portion of an embodiment of a combustion apparatus for steam generation, wherein the outer casing is omitted to reveal the exterior of the combustion chamber and the plurality of converging coolant inlets.
Figure 8:
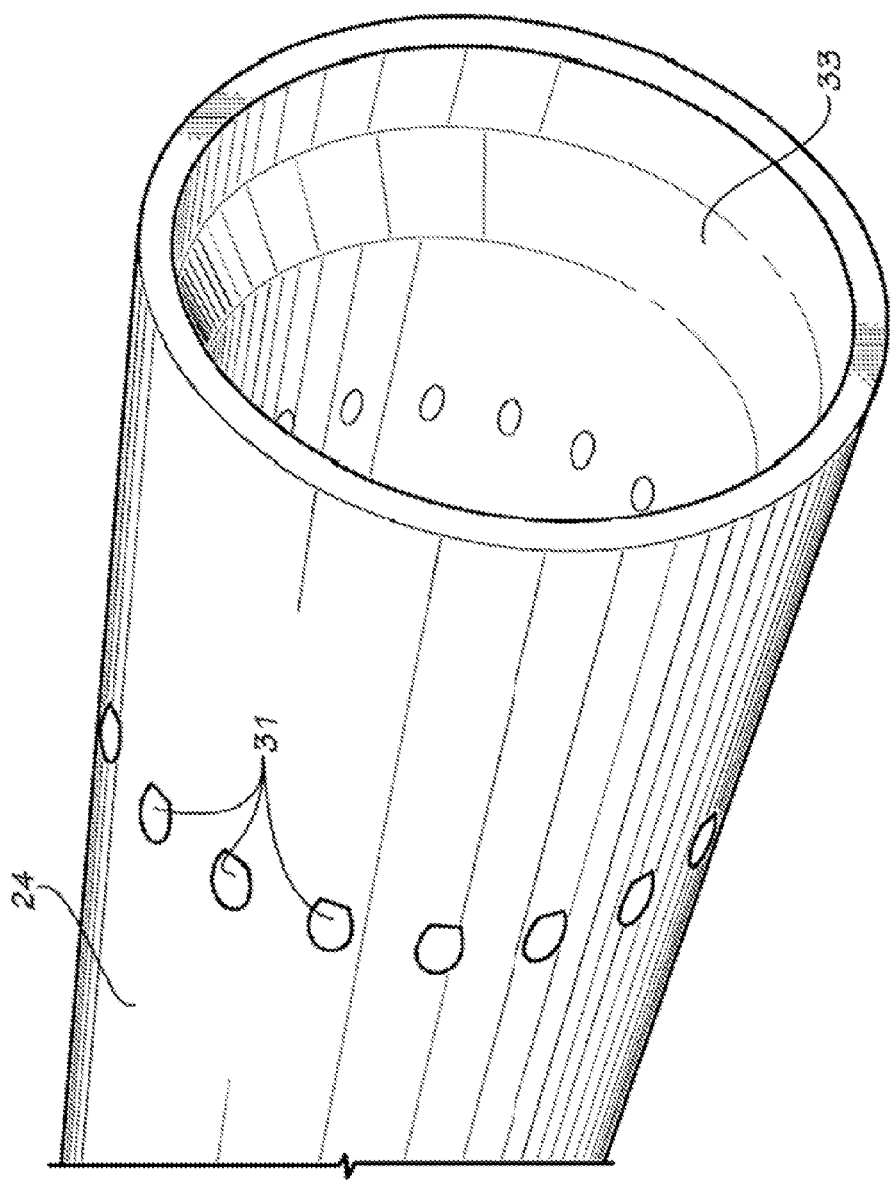
FIG. 8 is a perspective view of the outlet end portion of the combustion chamber according to one embodiment of an apparatus for combustion steam generation as described herein.

The outlet end of the combustion chamber 24 is detailed in FIGS. 7 and 8. As shown in FIG. 7, an outlet end of a combustion chamber 24 is connected to an exit flame diffuser 13. The outer casing that ordinarily would enclose the combustion chamber 24 and define a coolant chamber is not shown for purposes of clarity of the underlying structures. A plurality of converging coolant inlets 31 are radially disposed around the combustion chamber 24. The plurality of converging coolant inlets 31 extend through the wall of the combustion chamber 24 at an angle to the direction of flow of combustion product through the combustion chamber 24. The converging coolant inlets are configured to produce a converging-diverging nozzle from the coolant conducted into the combustion chamber. In a preferred embodiment, the angle of the converging coolant inlets is between about 25 degrees and about 35 degrees. In another preferred embodiment, the angle of the converging coolant inlets is about 30 degrees.

In FIG. 8, the exit flame diffuser that ordinarily would connect to the outlet end of the combustion chamber is omitted to show the internal wall at the outlet end of the combustion chamber 24. The converging coolant inlets 31 are configured to produce a converging-diverging nozzle from the coolant injected into the combustion chamber 24. In order to form a converging-diverging nozzle, water (coolant) is injected through the converging water inlets 31 at an angle to the axis of the cylindrical combustion chamber 24. Flowing combustion product pushes the water through the out end of combustion chamber 24. The water reduces the effective cross-sectional area of the combustion chamber 24 and establishes the throat of a converging-diverging nozzle. In a preferred embodiment, the flow rate of the combustion product accelerates to the speed of sound as it converges. As the combustion product exits the throat, it enters a diverging section 33 of the combustion chamber and/or exit flame diffuser. In the diverging section 33, the internal diameter of the flow path increases and the velocity of the gases may increase to supersonic speeds.

III. Systems and Methods for Enhanced Oil Recovery

Systems and methods of producing steam and extracting hydrocarbons from hydrocarbon reservoirs or hydrocarbon formations are provided in accordance with certain embodiments described herein. These systems include the ACTG devices described herein deployed downhole to produce steam and carbon dioxide for enhanced recovery of oil or other hydrocarbons.

The ACTG devices may be used to reduce or eliminate surface steam losses that occur in traditional steam injection enhanced oil recovery systems and methods. Advantageously, ACTG devices may deliver steam directly to a reservoir interface. Such embodiments may be particularly useful for reservoirs at depths over 2,500 feet and/or reservoirs that comprise heavy oil or bitumen. Such embodiments also be used in offshore or near-offshore reservoirs and to extract heavy oil or bitumen under permafrost conditions. The steam quality produced by ACTG devices may be controlled as needed. For example, embodiments may produce steam qualities of between about 10 percent and about 95 percent or more. In one embodiment, the steam quality produced is from about 75 percent to about 95 percent, such as from about 85 percent and about 95 percent. In preferred embodiments, the ACTG device produces steam at a steam quality between 90 percent and 100 percent, available to the hydrocarbon formation.

Systems are provided for extracting hydrocarbons from a hydrocarbon formation. Systems for enhanced oil recovery include a first wellbore for delivering steam and/or other hot gases to a hydrocarbon reservoir and an advanced combustion thermal generator device of an embodiment of the present invention (see descriptions in sections I and II above). The ACTG device may be located downhole in the first wellbore. The steam and/or other hot gases may provide heat to the hydrocarbons in the formation to reduce the viscosity and/or vaporize part of the hydrocarbons. In a preferred embodiment, the hydrocarbon reservoir may include heavy oil, bitumen, methane hydrate, or a combination thereof.

The systems for enhanced oil recovery optionally may further include a second wellbore for extracting hydrocarbons from a hydrocarbon reservoir. Either one or both of the first and second wellbores may be vertical wellbores in accordance with various embodiments of the presently disclosed devices, systems, and methods. Alternatively, either one or both of the first and second wellbores may include at least one horizontal section. An ACTG device may be located at any point in the wellbore including in a vertical section or a horizontal section of the wellbore. An ACTG device also may be located at any depth in the wellbore. The ACTG device is particularly advantageous in uses where the ACTG device is deployed to a depth below the surface of greater than 2,500 feet.

The systems for enhanced oil recovery optionally may further include a casing string extending from about the top of the first wellbore to about the bottom of the first wellbore. In a preferred embodiment, an ACTG device may be located within the casing string.

The systems for enhanced oil recovery may further include a fuel source, an oxidizer source, and/or a coolant source. The fuel source, oxidizer source, and/or coolant source may be connected to an ACTG device by a coiled tubing control line. The coiled tubing control line optionally may include a fuel feed line, and oxidizer feed line, and/or a coolant feed line. The coiled tubing control line optionally may also include a fiber optic data line and/or a power line.

Figure 9:
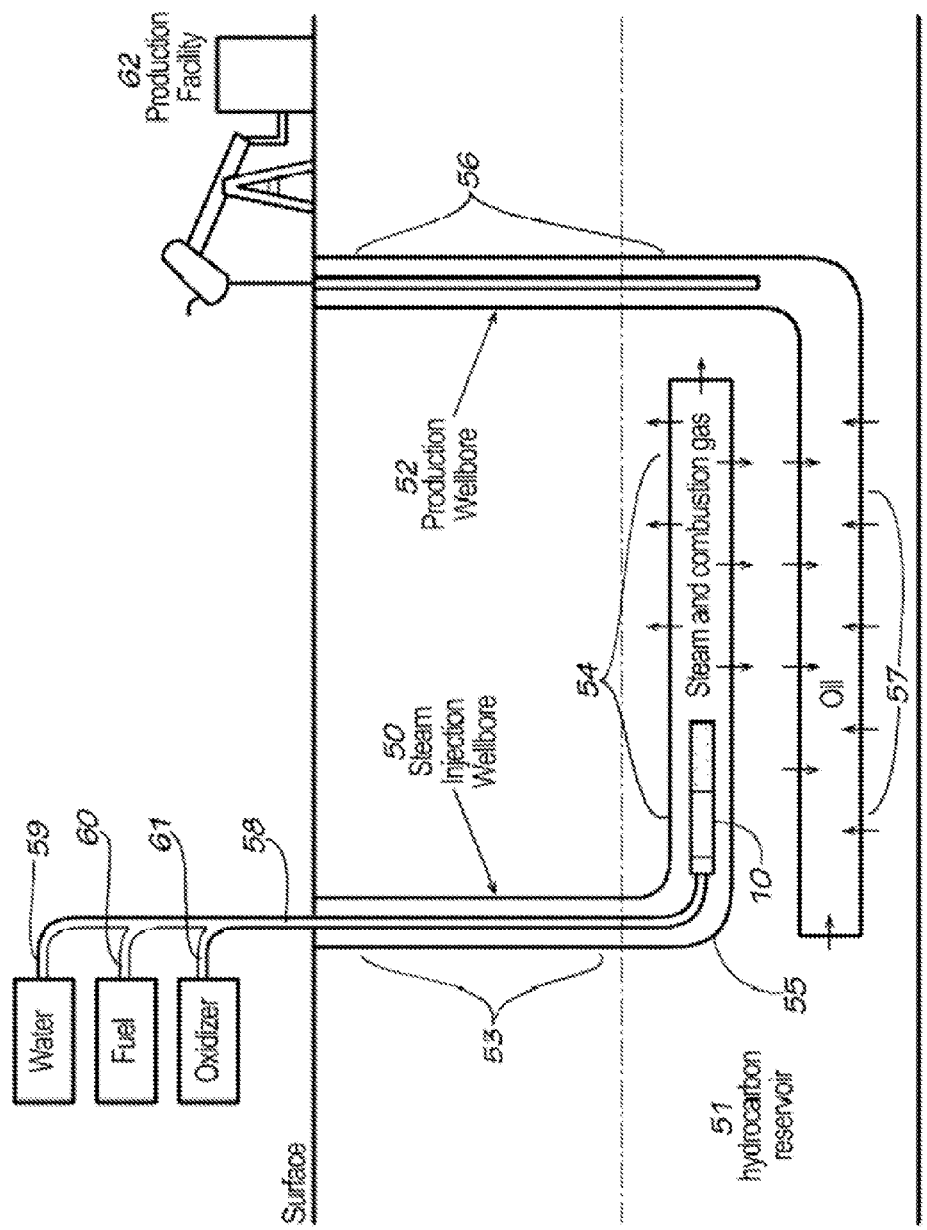
FIG. 9 is a schematic diagram illustrating a system for extracting oil from an oil formation according to one embodiment of the systems and methods described herein.

As shown in FIG. 9, a steam-assisted gravity drainage system utilizing an ACTG device as described herein may be used. The system includes a first wellbore 50 for delivering steam and/or other hot gases to a hydrocarbon reservoir 51 (the "Steam Injection Wellbore"). In a preferred embodiment, the hydrocarbon reservoir includes heavy oil, bitumen, and/or methane hydrate. The system also includes a second wellbore 52 for extracting hydrocarbons from the hydrocarbon reservoir 51 (the "Production Wellbore"). An ACTG device 10 is located downhole in the casing string of the first wellbore 50. The ACTG device is connected to water, fuel, and oxidizer sources at the surface via a control line 58 that includes a water feed line 59, a fuel feed line 60, and an oxidizer feed line 61. In alternative embodiments, the control line may further comprise a fiber optic data line and/or a power line.

The first wellbore includes a vertical section 53 and a horizontal section 54. The ACTG device 10 is sized to fit within the wellbore 50 and sized to pass through the turn sweep 55 used in the horizontal wellbore. The second wellbore also includes a vertical section 56 and a horizontal section 57. The horizontal section of the second wellbore is located under the horizontal section of the first wellbore.

The ACTG device 10 may generate steam and combustion gas by methods described herein. For example, the ACTG device 10 may generate steam and combustion gas by introducing a fuel and an oxidizer into an inlet end of a combustion chamber, combusting the fuel and the oxidizer in the combustion chamber to produce a combustion product, flowing water into a coolant chamber defined between an outer casing and an outer surface of the combustion chamber at or near the inlet end of the combustion chamber, and flowing the water from the coolant chamber, through a plurality of converging coolant inlets radially disposed around the combustion chamber, and into the combustion chamber at or near the outlet end of the combustion chamber, such that the water forms a converging-diverging nozzle through which the combustion product flows, the water becoming heated by the combustion product to form steam. In a preferred embodiment, the fuel, the oxidizer, and the water may be metered to produce steam at a pressure from about 120 psig to about 2,950 psig. In another preferred embodiment, the fuel, the oxidizer, and the water may be metered to produce steam at a steam quality of from about 75 percent to about 99 percent, such as from about 85 percent to about 95 percent.

The steam and combustion gas may be injected into the wellbore 50 and/or into the hydrocarbon formation 51 by the ACTG device 10. In a preferred embodiment, the ACTG device 10 is deployed at a depth greater than 2,500 feet and the steam and combustion gas is injected into the well bore 50 and/or into the hydrocarbon formation 51 at a depth greater than 2,500 feet. In a preferred embodiment, the steam is injected into the hydrocarbon formation 51 at a pressure from about 120 psig to about 2,950 psig. In another preferred embodiment, the steam is injected into the hydrocarbon formation 51 at a steam quality of between about 75 percent and about 95 percent. In another preferred embodiment, the combustion product comprises at least 50 percent carbon dioxide. In another preferred embodiment, the carbon dioxide is a supercritical fluid. In another preferred embodiment, the carbon dioxide is injected into the hydrocarbon formation in an amount effective to decrease the viscosity of the hydrocarbons in the hydrocarbon formation 51. In another embodiment, the carbon dioxide swells the oil and/or increases oil flow drive.

The injection of steam and combustion gas (including carbon dioxide) into the hydrocarbon reservoir 51 causes a decrease in the viscosity of the hydrocarbons in the reservoir 51. The less viscous hydrocarbons flow down to the horizontal portion 57 of the second wellbore 52. A production facility 62 at the surface of the second wellbore 52 extracts hydrocarbons from the hydrocarbon formation.

Figure 10:
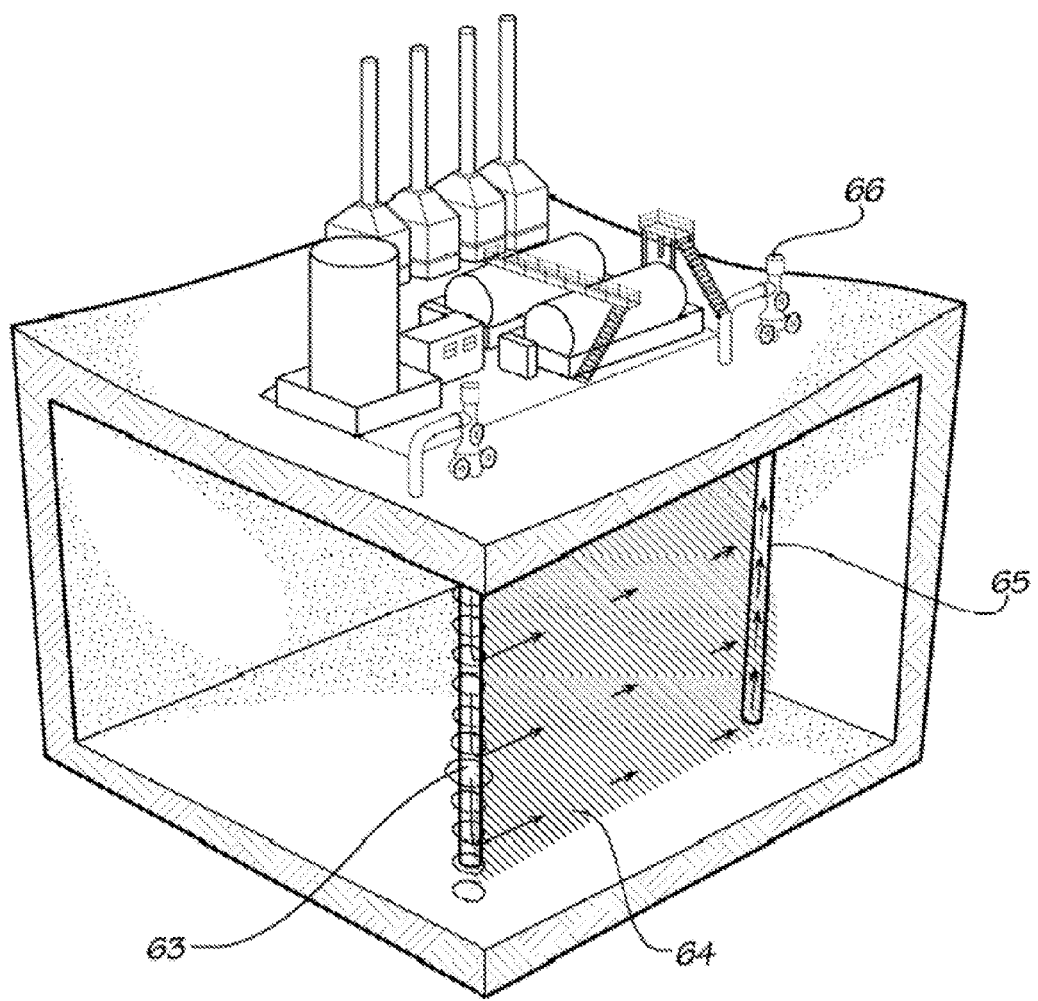
FIG. 10 is a schematic diagram illustrating a system for extracting oil from an oil formation according to another embodiment of the systems and methods described herein.

FIG. 10 shows a steam flooding system utilizing an ACTG device as described herein. The system includes a first wellbore 63 for delivering steam and/or other hot gases to a hydrocarbon reservoir 64. In a preferred embodiment, the hydrocarbon reservoir includes heavy oil, bitumen, and/or methane hydrate. The system also includes a second wellbore 65 for extracting hydrocarbons from the hydrocarbon reservoir 64. Both the first wellbore 63 and the second wellbore 65 are vertical wellbores.

An ACTG device (not shown) is located downhole in the casing string of the first wellbore 63. In a preferred embodiment, the ACTG device is located at a depth at or greater than 2,500 feet. The steam and combustion product produced by ACTG device is injected into the hydrocarbon reservoir 64. In this embodiment, the steam and hot gases form a steam front, which heats the hydrocarbons, lowers the viscosity of the hydrocarbons, and pushes the hydrocarbons towards the production wellbore 65. A production facility 66 at the surface of the production wellbore 65 extracts hydrocarbons from the hydrocarbon formation.

Figure 11:
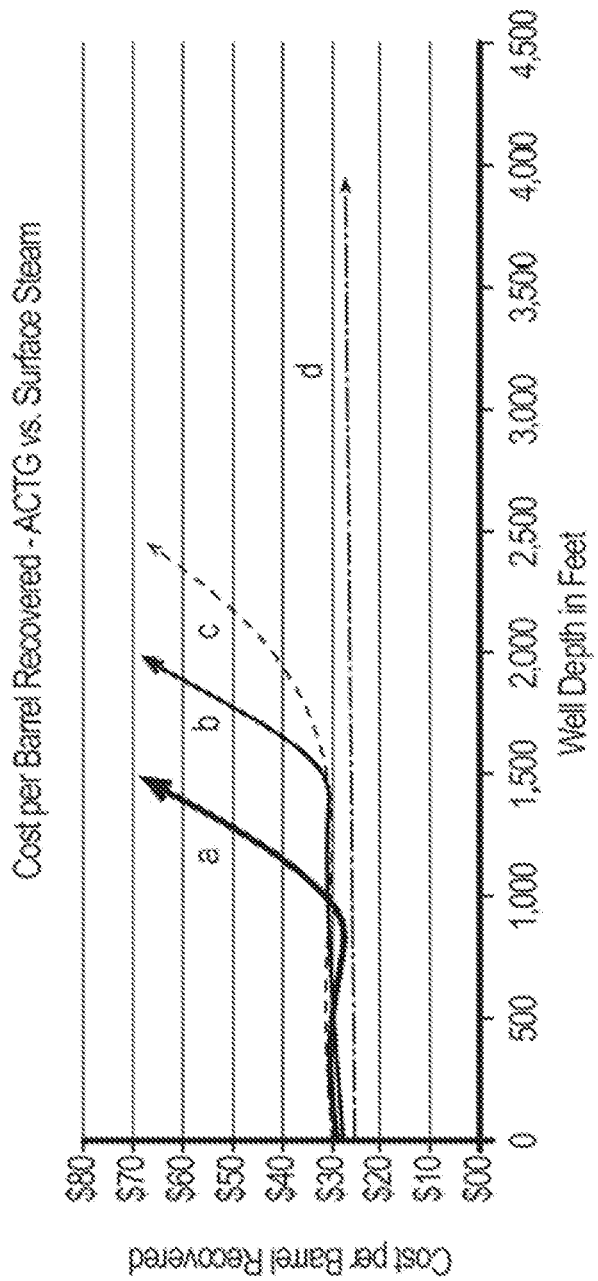
FIG. 11 is a graph illustrating the cost per barrel of oil produced using steam injection at varying well depths.

Unlike traditional steam-based enhanced oil recovery techniques, the present devices and systems are not limited by depth. Accordingly, the devices, systems, and methods may reduce the cost of oil production, particularly at depths below about 1,500 feet. FIG. 11 is a graph illustrating the cost per barrel of oil produced using steam injection at varying well depths. Curves a, b, and c depict the cost per barrel of oil recovered using surface steam at various steam qualities. Curve a depicts the cost per barrel of oil recovered using surface steam at 40 percent quality and a 0.92 kg/sec rate of injection. Curve b depicts the cost per barrel of oil recovered using surface steam at 80 percent quality and a 0.92 kg/sec rate of injection. Curve c depicts the cost per barrel of oil recovered using surface steam at 80 percent quality and a 2.75 kg/sec rate of injection.

Curve d depicts the cost per barrel of oil recovered using an embodiment of the systems and devices described herein. Unlike surface steam, the cost per barrel of oil recovered using the present devices and systems does not vary appreciably with well depth. Thus, these devices, systems, and methods offer cost advantages over traditional enhanced oil recovery methods, particularly for deep and/or heavy deposits.

Figure 12:
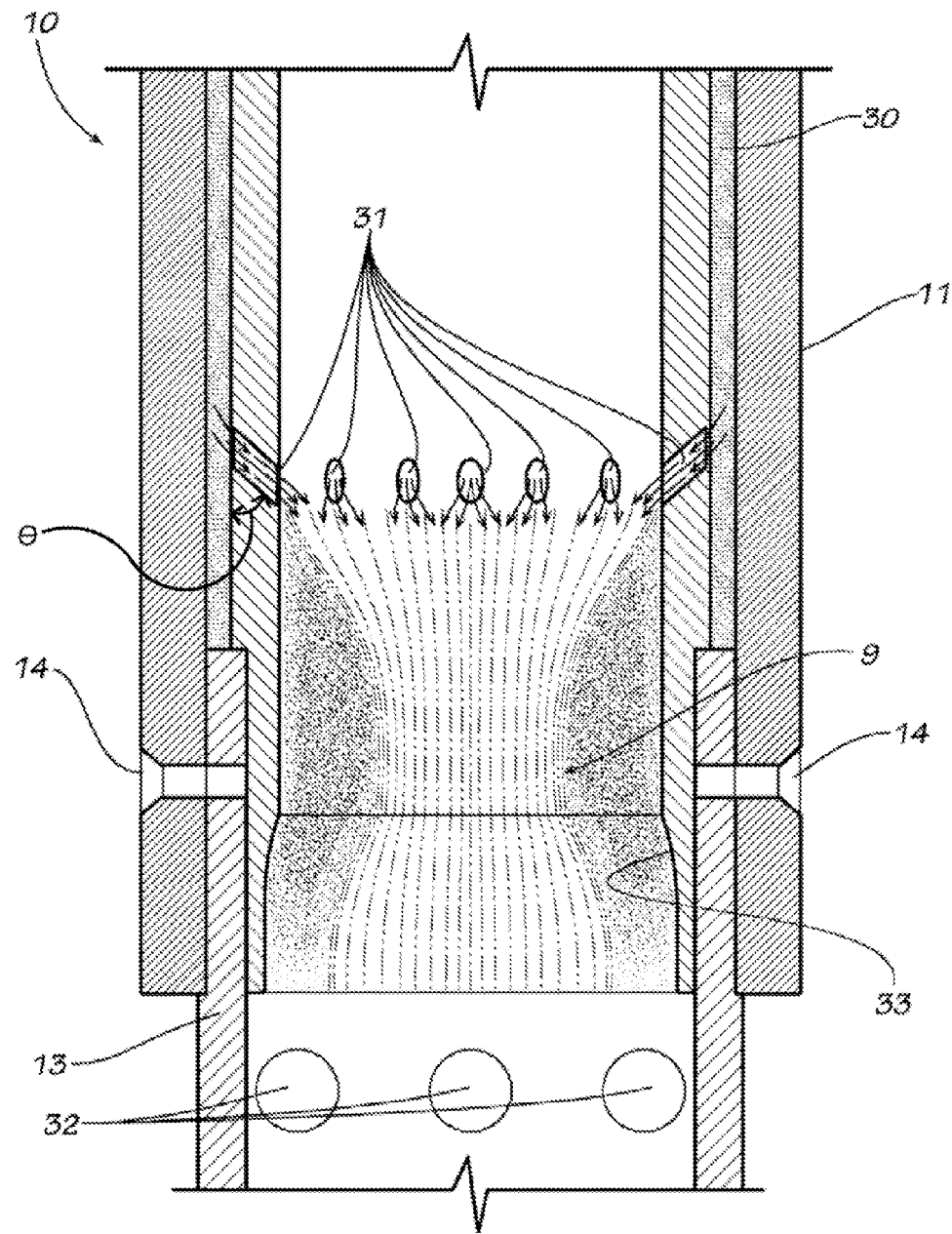
FIG. 12 is a cross sectional view of an embodiment of a convergent-divergent nozzle device as described herein.

FIG. 12 shows the flow of coolant to form a converging-diverging nozzle in an ACTG device 10. As described in section I above, the ACTG device 10 includes a combustion chamber 24 and an outer casing 11 that define a coolant chamber 30. In operation, coolant fills the coolant chamber 30. A plurality of converging coolant inlets 31 are radially disposed around the combustion chamber 24. Coolant flows from the coolant chamber 30 through the converging coolant inlets 31 into the combustion chamber 24 at or near the outlet end of the combustion chamber 24. The converging coolant inlets 31 are configured to produce a converging-diverging nozzle 9 from the coolant conducted into the combustion chamber 24. Converging-diverging nozzles are described in more detail in section II above. After flowing into the combustion chamber 24, the coolant initially converges toward the axial centerline of the combustion chamber 24 but is forced outward to the wall of the combustion chamber by the force of the flowing combustion product. The coolant, being an incompressible fluid, forms a layer of water concentric with the combustion chamber wall. This concentric layer of water serves as a throat though which the combustion product must flow. Combustion product from the combustion chamber may accelerate through the converging section and the throat to sonic or supersonic velocities. After the throat, the combustion product and coolant flow to a diverging section 33 and an exit flame diffuser 13. A plurality of holes 32 are provided in the walls of the exit flame diffuser 13. In the diverging section 33 and the exit flame diffuser 13 the combustion product may continue to accelerate to supersonic velocities. In one embodiment, the coolant is water and is heated by the combustion product in the diverging section 33 and/or the exit flame diffuser 13. In another embodiment, the diverging section 33 is integral with or forms a part of the exit flame diffuser 13. The conversion of water to steam is depicted by the shading in FIG. 12. A mixture of combustion product and steam may exit the ACTG device 10 and be injected into a wellbore and/or a hydrocarbon formation.

Devices and systems for enhanced oil recovery may optionally include other standard well production equipment; packer(s); a controller system for measuring the process conditions (e.g., temperature, pressure) and adjusting pressures and flow rates of fluids to an ACTG device. Advantageously, the device or system may be controlled to manage production from the reservoir. For example, the flow of oxidizer, fuel, and coolant may be regulated to provide the desired amount of steam and pressure (e.g., steam may be provided from 120 psig to 2950 psig).

The presently disclosed devices, systems, and methods may also be used in a larger scale surface steam configuration for shallow wells, tar sands and shale. Thermal conversion efficiencies of fuel-to-steam in excess of 99 percent, nearly penalty free compression, and 50 percent ratio of pure carbon dioxide as a byproduct of combustion may be achieved by such a model.

Devices and systems for enhanced oil recovery of the present invention also optionally may deliver downhole chemical payloads to the formation as needed. For example, applications may include flame front control, oxidizer delivery for in situ combustion, and underground coal gasification. Such modification and adaptations are within the skill of one of ordinary skill in the art and are intended to come within the scope of the appended claims Publications cited herein and the materials for which they are cited are specifically incorporated by reference in their entirety without admission that such is prior art. Modifications and variations of the devices, systems, and devices described herein will be obvious to those skilled in the art from the foregoing detailed description. Such modifications and variations are intended to come within the scope of the appended claims.

I claim:

1. A method for reducing the viscosity and/or vaporizing hydrocarbons in an underground hydrocarbon reservoir, the method comprising:
    generating steam downhole within a wellbore using a system which comprises a combustion chamber located within the wellbore;
    accelerating the steam to a supersonic speed within the wellbore using a convergent-divergent nozzle; and
    injecting the accelerated steam into a hydrocarbon formation,
    wherein the nozzle has a throat that is formed of flowing water.

2. The method of claim 1, wherein the hydrocarbon formation comprises heavy oil, bitumen, methane hydrate, or a combination thereof.

3. The method of claim 1, wherein the accelerated steam has a steam quality between 90% and 100%.

4. The method of claim 1, wherein the accelerated steam further includes carbon dioxide gas mixed therein.

5. The method of claim 1, wherein the steam is generated at a depth greater than 2500 feet underground.

6. The method of claim 1, wherein the convergent portion of the nozzle is formed of flowing water.

7. A method for reducing the viscosity and/or vaporizing hydrocarbons in an underground hydrocarbon reservoir, the method comprising:
    using a combustion apparatus placed downhole within a wellbore to generate steam;
    accelerating the steam to a supersonic speed within the wellbore using a convergent-divergent nozzle; and
    injecting the accelerated steam into a hydrocarbon formation which comprises heavy oil, bitumen, methane hydrate, or a combination thereof,
    wherein the nozzle has a throat that is formed of flowing water.

8. The method of claim 7, wherein the accelerated steam has a steam quality between 90% and 100%.

9. The method of claim 7, wherein the accelerated steam further includes carbon dioxide gas mixed therein.

10. The method of claim 7, wherein the steam is generated at a depth greater than 2500 feet underground.

11. The method of claim 7, wherein the convergent portion of the nozzle is formed of flowing water.

12. The method of claim 7, wherein the combustion apparatus is an advanced combustion thermal generator (ACTG).

13. A method for reducing the viscosity and/or vaporizing hydrocarbons in an underground hydrocarbon reservoir, the method comprising:
    producing steam using a combustion apparatus, which comprises a combustion chamber, wherein the combustion chamber is positioned downhole within a wellbore and is defined in part by a sidewall;
    using the combustion apparatus to accelerate the steam produced; and
    injecting the accelerated steam into a hydrocarbon formation,
    wherein the steam is accelerated by injecting water into the combustion chamber in a manner effective to cause flowing combustion products to form a layer of water concentric with the sidewall, to push the water through an outlet end of the combustion chamber, and to cause the injected water to establish the throat of a converging-diverging nozzle.

14. The method of claim 13, wherein the steam is accelerated to a supersonic velocity.

* * * * *